United States Patent [19]

Crivello et al.

[11] Patent Number: 5,468,390

[45] Date of Patent: Nov. 21, 1995

[54] LOW FOULING ULTRAFILTRATION AND MICROFILTRATION ARYL POLYSULFONE

[75] Inventors: James V. Crivello, Clifton Park; Georges Belfort, Slingerlands; Hideyuki Yamagishi, Troy, all of N.Y.

[73] Assignee: Rensselaer Polytechnic Institute, Troy, N.Y.

[21] Appl. No.: 171,847

[22] Filed: Dec. 22, 1993

Related U.S. Application Data

[63] Continuation of Ser. No. 980,477, Nov. 23, 1992, abandoned.

[51] Int. Cl.⁶ .................................................. B01D 71/68
[52] U.S. Cl. ................ 210/490; 210/500.35; 210/500.41
[58] Field of Search ...................................... 210/638, 651, 210/652, 490, 500.35, 500.41; 427/245, 246; 264/22

[56] References Cited

U.S. PATENT DOCUMENTS

| | | | |
|---|---|---|---|
| 4,396,476 | 8/1983 | Roemer et al. | 523/115 X |
| 4,618,533 | 10/1986 | Steuck | 427/245 X |
| 4,959,150 | 9/1990 | Degen | 210/500.35 X |
| 5,069,926 | 12/1991 | Iwata et al. | 427/40 |

*Primary Examiner*—Frank Spear
*Attorney, Agent, or Firm*—Notaro & Michalos

[57] ABSTRACT

A photochemical grafting process permits the attachment of free radically polymerizable monomers to the surface of aryl polysulfone membranes. The process, which does not use sensitizers, results in membrane compositions which can be used for ultrafiltration and microfiltration membranes and which exhibit low or non-fouling characteristics.

11 Claims, 5 Drawing Sheets

5,468,390

LOW FOULING ULTRAFILTRATION AND MICROFILTRATION ARYL POLYSULFONE

This application is a continuation of application Ser. No. 07/980,477, filed Nov. 23, 1992 now abandoned.

FIELD AND BACKGROUND OF THE INVENTION

The present invention relates in general to new and useful modified membrane compositions for use in ultrafiltration and microfiltration processes, having advantageous flow characteristics and mechanical strength and to a process for their preparation.

During the past 25 years, ultrafiltration and microfiltration processes have found wide application in such industries as the pharmaceutical, food, automotive, electronic, biotechnology, chemical and dairy industries.

Aryl polysulfone polymers are commonly used by many manufactures to produce ultrafiltration membranes and supports for reverse osmosis membranes prepared by interfacial polymerization. These include U.S. manufacturers such as Amicon Div., W. R. Grace, Mass; Dow Company, Michigan; Gelman Sciences, Inc., Michigan; Millipore Corp., Massachusetts; Osmonico Inc., Minnesota; Koch, Mass; and Pall Corp.

In many applications, these aryl polysulfone membranes, which are relatively hydrophobic in character, are very susceptible to membrane fouling and plugging by dissolved solutes such as proteins or suspended colloids such as latex paint particles. Adsorption of such solutes in the membrane pores can impede and constrict the flow through the membrane and result in diminished performance. By modifying these aryl polysulfone membranes, using the present invention, solute-membrane interactions will be reduced and this results in improved long-term performance. Thus, for example, recovery and purifications of valuable proteins using ultrafiltration would be more efficient when using modified aryl polysulfone membranes of the present invention rather than unmodified commercially available aryl polysulfone membranes.

SUMMARY OF THE INVENTION

The present invention includes novel membrane compositions made according to a novel process.

The present invention thus includes a simple, direct and commercially attractive process for modifying an aryl polysulfone membrane using a photo-grafting process and the modified membrane itself. According to the invention, ultraviolet light is radiated onto the membrane for a selected period of time while the membrane is in the presence of a hydrophilic vinyl monomer. This permits the attachment of free radically polymerizable monomers onto the surface of the membranes. The process does not use sensitizers and results in a membrane composition which can be used for ultrafiltration and microfiltration with low or non-fouling characteristics.

Accordingly, one object of the present invention is to provide a process for modifying aryl polysulfone membranes which comprises placing an aryl polysulfone membrane into the presence of a hydrophilic vinyl monomer and exposing the membrane to ultraviolet light for a selected period of time.

A further object of the invention is to provide a modified aryl polysulfone membrane composition according to the present invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

According to one embodiment of the invention, aryl polysulfone membranes are exposed for different periods of time to ultraviolet (UV) light at a wavelength of approximately 254 nm in the presence of hydrophilic monomers such as 0.1 wt % 2-hydroxyethyl methacrylate (HEMA) in methanol (MeOH) under an inert or nitrogen atmosphere at 20° C. HEMA attaches to the surface layers of the base aryl polysulfone membranes causing a change from their native hydrophobic state to a new modified hydrophilic water-wetting state. Many other monomers besides HEMA and polysulfone polymer can be used in this process. Other examples include glycidyl methacrylate (GMA) as a monomer and polyether sulfone as a membrane. The selected period of irradiation time is between about ½ and 20 minutes.

The ultraviolet lamp used according to the present invention had a broad emission band which had a maximum at about 254 nm. Other sources of UV light may be used according to the present invention. It is here emphasized that the invention includes not only the process for making the modified membranes and membrane compositions, but the membranes and the membrane compositions themselves.

Experiments were conducted to confirm the presence of the hydrophilic modification of polysulfone (PS) membranes and the superior transport characteristics of these modified membrane as compared to the unmodified membranes. Mechanical tests were also conducted to verify that the surface modification did not unduly weaken the base membranes.

Figure 1:
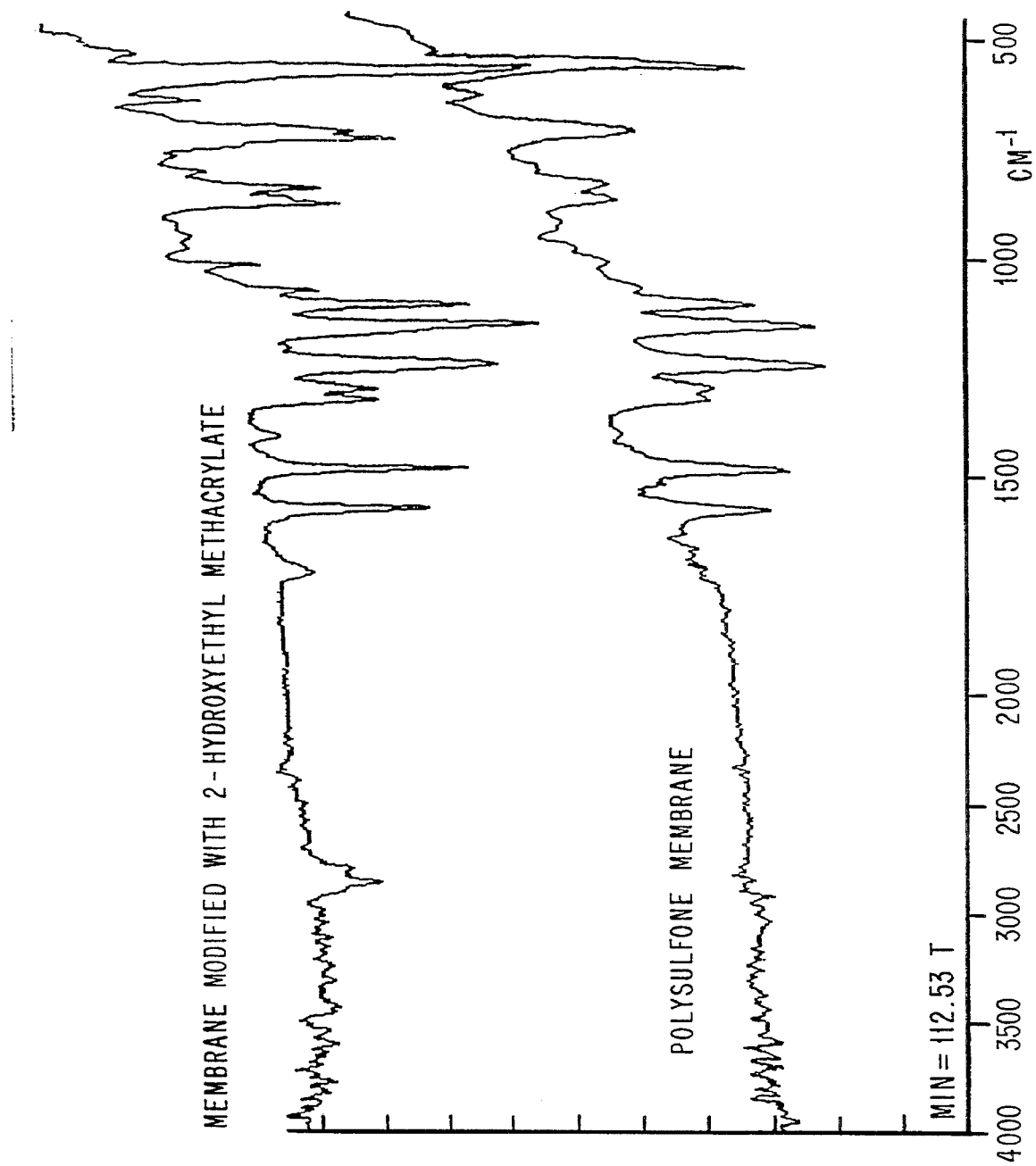
FIG. 1 is a composite illustration of an ATR/FTIR spectrum indicating the modification of membranes according to the present invention.

An ATR/FTIR spectrum of the surface of a 2-hydroxyethylacrylate modified (according to the procedure of the invention) and an unmodified polysulfone membrane were obtained with a Fourier Transform Infrared Spectrometer (Model 1800, Perkin Elmer, Corp., CT). An ATR accessory was used with an incident angle of 45° giving a depth of 0.42–4.2 micrometers. The spectra shown in FIG. 1 clearly indicate the presence of the carbonyl group from HEMA at 1728, 2850 and 2930 cm$^{-1}$. Otherwise the two surfaces are similar. This demonstrates the presence of the hydrophilized surface.

Figure 2:
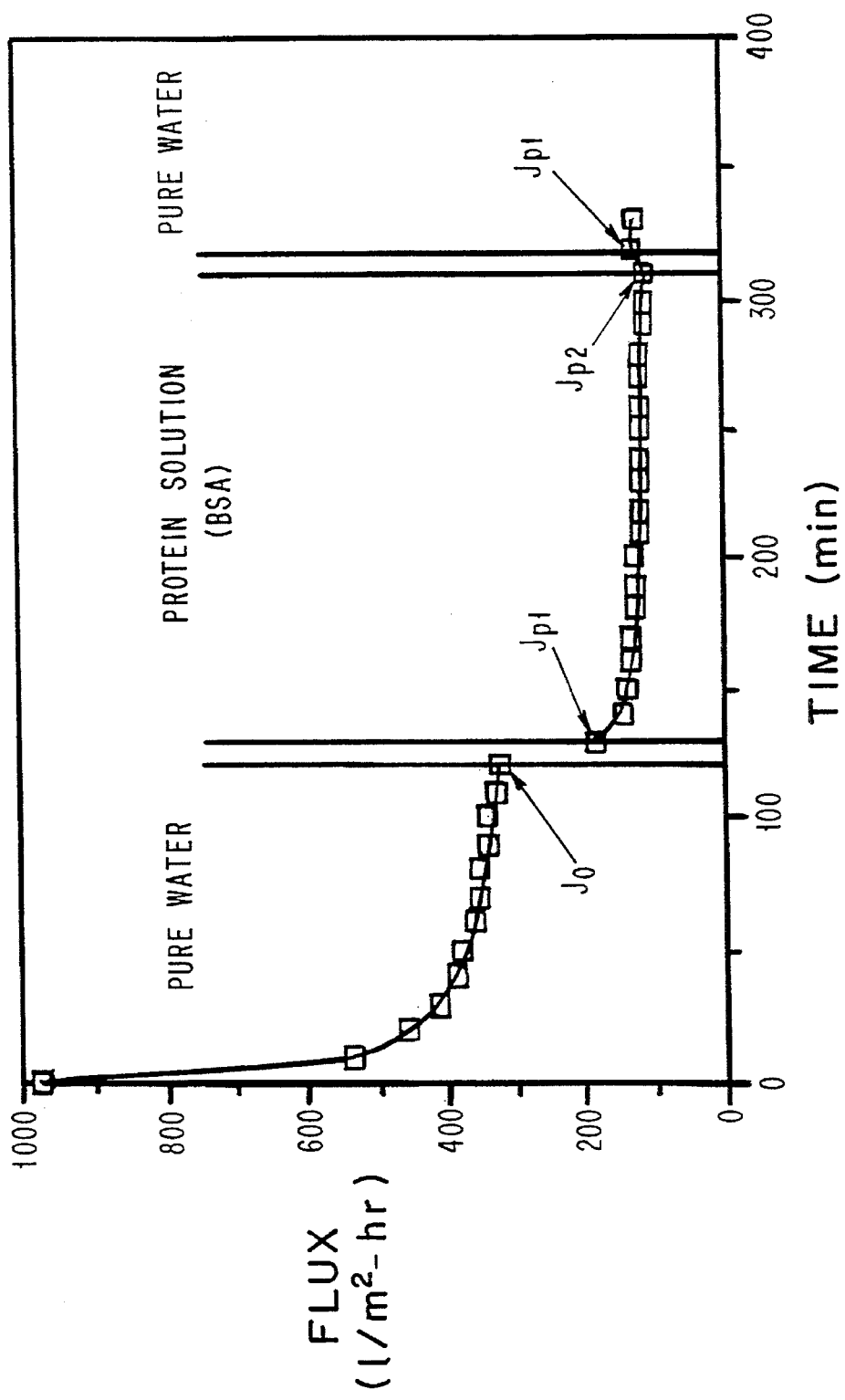
FIG. 2 is a graph plotting flux through the membrane against time to demonstrate the effectiveness of transport through the modified membrane of the present invention.

As examples of two widely used geometric shapes for commercial applications, polysulfone membranes in the form of a hollow fiber and a flat sheet film were UV-modified by the process of the invention with HEMA and tested for their superior transport properties as compared to the unmodified membranes. Both types of membranes were challenged with the well-known fouling aqueous solution of 0.1 wt% bovine serum albumin (BSA, Product No A7511, Sigma Chemical Co, Ill. ). The flat sheet membranes were tested in a commercial ultrafiltration cell (13.4 cm$^2$, Model 8050, Amicon Div., W. R. Grace Corp, Mass ) at 30° C. The hollow fibers were potted in a small polycarbonate shell (Vitafiber, Amicon DIv., W. R. Grace and CO, Mass ) so as to make a shell and tube mass exchanger. Typical experiments were conducted as shown in the schematic graphs in FIG. 2.

The permeation volume flux (volume of liquid permeated per unit area and per unit time) and the BSA retention (the weight fraction of BSA in the feed that is retained in the feed) were both monitored as a function of time. Initially, particle-free, organic-free and salt-free pure water (UV exposed, deionized and purified with reverse osmosis and 10,000 MWCO ultrafiltration) was passed across the membranes for 2 hr. Then, the BSA protein solution was used as feed for the next 3 hrs, and finally, a pure water feed was used for 1 hr. The three experiments obtained $J_o$ (water flux after 2 hr), (initial volume flux with BSA solution), $J_1$ (final volume flux with BSA solution) and $J_1$ (final water flux after changing from BSA solution to pure water). This established the following parameters:

1. $J_{p2}$ (with modified membrane)/$J_{p2}$ original(with unmodified membrane) as a measure of the potential of the modified membrane for increased permeation flux.
2. $J_{p2}/J_{p1}$ as a measure of fouling by the 0.1 wt % BSA solution of the modified membrane.
3. $J_1/J_2$ as a measure of the ability of water to defoul (clean) the modified membrane.
4. BSA retention (the weight fraction of BSA in the feed that is retained in the feed, also called rejection) was monitored as a function of time for each membrane during the three hours with BSA feed.

Figure 3A:
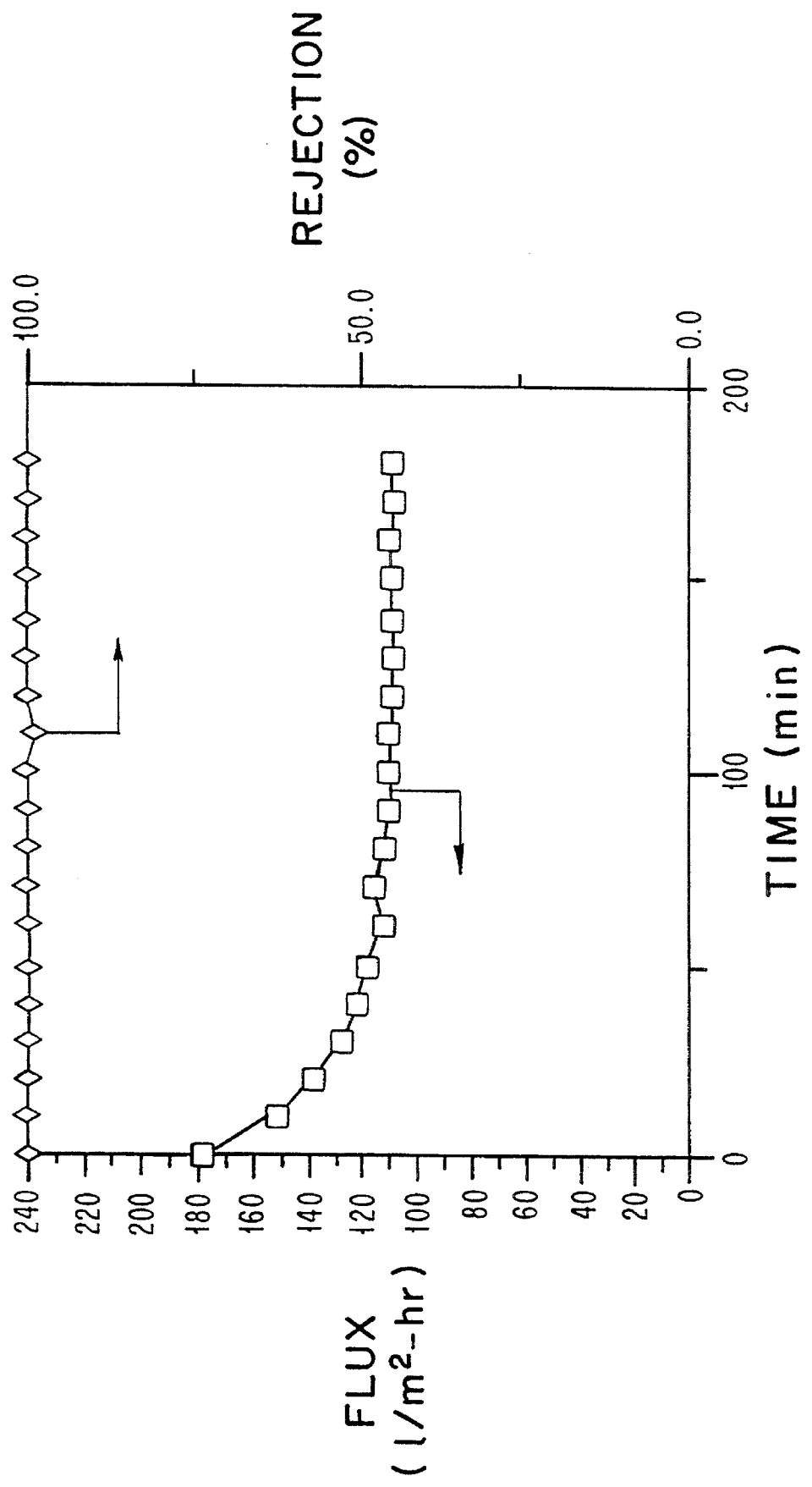
FIG. 3a is a graph plotting flux through the membrane against time of an unmodified membrane before it is subjected to the process of the present invention.
Figure 3B:
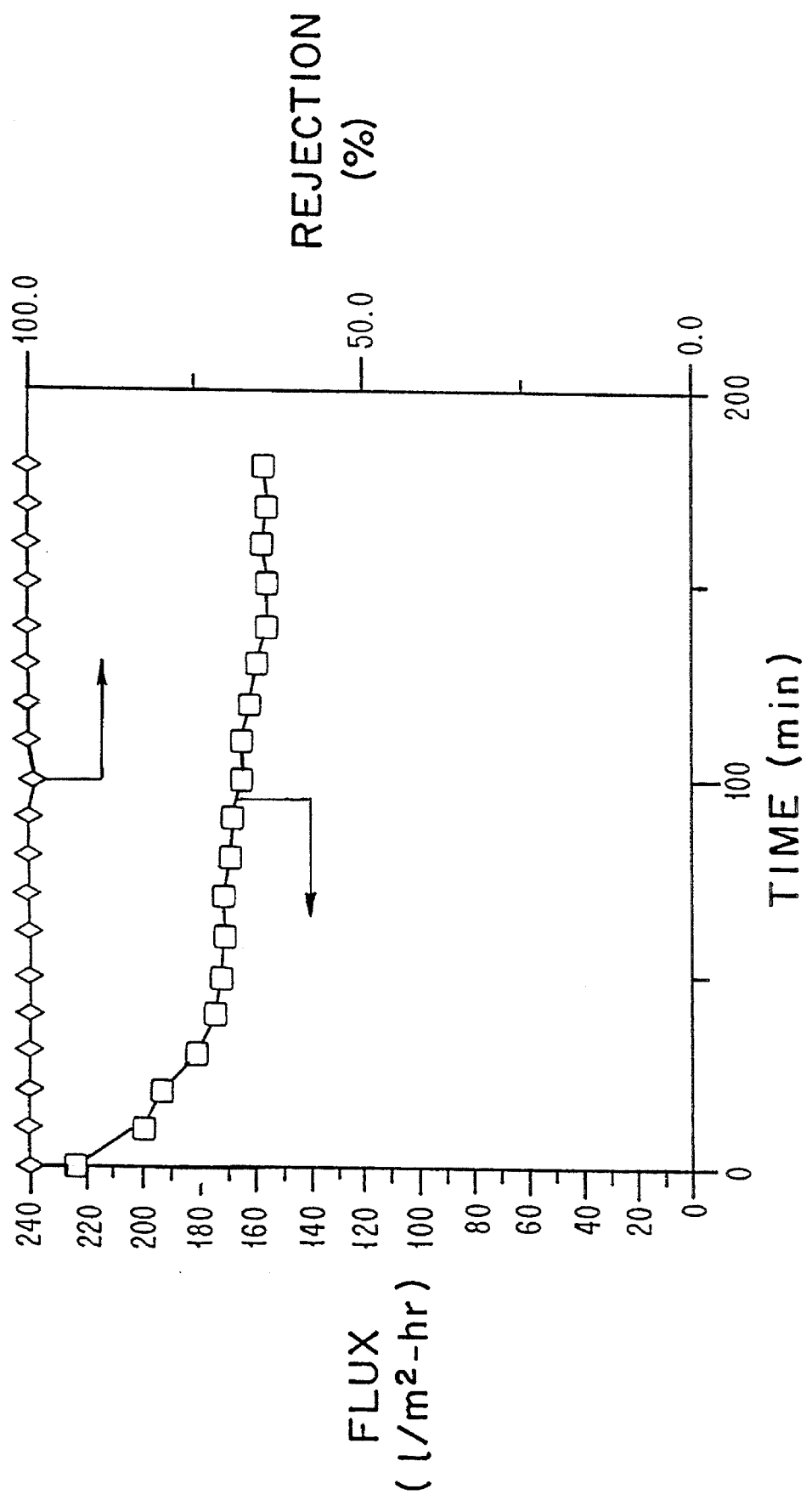
FIG. 3b is a graph similar to FIG. 3a showing the results of a membrane modified according to the present invention.
Figure 4:
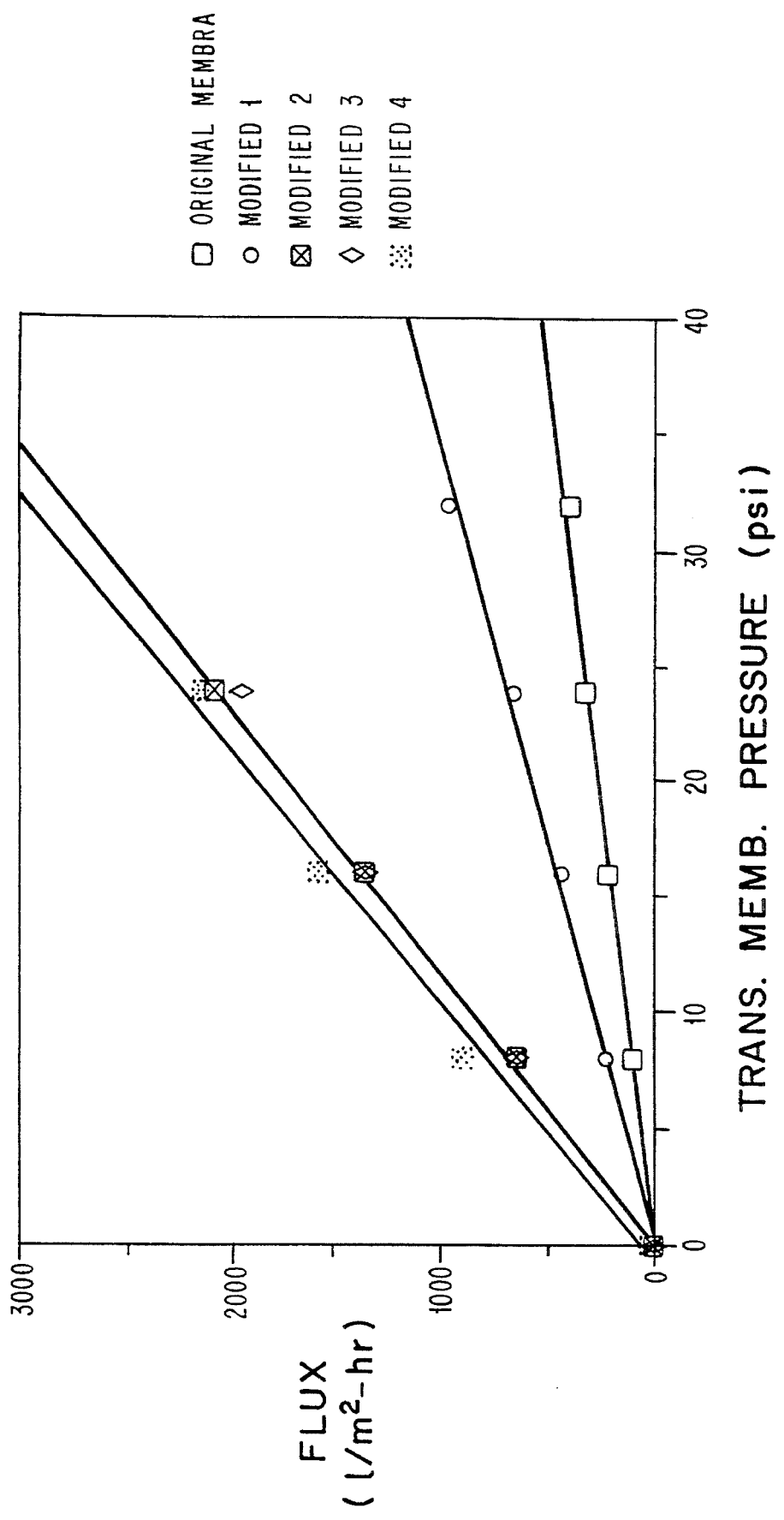
FIG. 4 is a graph plotting flux against transport membrane pressure for modified and un-modified membranes.

The larger the values of these parameters, the larger the advantage of using the modified membranes over the original unmodified membranes. A typical set of transport and retention data are shown in Table 1 and in FIGS. 3a, 3b and 4. Note that permeation flux as a function of transmembrane pressure is plotted in FIG. 4. The slope is a measure of the permeability coefficient and the higher the value is, the better the membrane permeation flux.

TABLE 1

Fouling Studies with 0.1 wt % BSA Solution

| Reaction Time | $J_0$ | $J_{p1}$ | $J_{p2}$ | $J_1$ | $J_{p2}/J_{p1}$[a] (%) | $J_1/J_0$[b] (%) | $J_{p2}/J_{p2}0$[c] (%) |
|---|---|---|---|---|---|---|---|
| 1 min | 268.07 | 202.24 | 127.68 | 181.45 | 63.13 | 67.69 | 115.3 |
| 3 min | 309.87 | 220.21 | 130.21 | 194.85 | 59.13 | 62.88 | 117.6 |
| 5 min | 317.11 | 206.82 | 151.49 | 221.55 | 73.25 | 69.87 | 136.8 |
| 10 min | 343.29 | 236.70 | 161.22 | 256.89 | 68.11 | 74.83 | 145.6 |
| 10 min | 225.65 | 212.24 | 151.37 | 221.34 | 71.32 | 98.09 | 136.7 |
| Original | 205.35 | 177.79 | 110.76 | 129.69 | 62.3 | 63.16 | — |

[a]Measure of fouling by protein solution in an AMICON Stirred Cell (model 8050).
[b]Relative water flux before and after fouling; a measure of cleaning
[c]Measure of improved flux for protein solution for modified membrane versus original polysulfone membrane
Modification conditions 0.1 wt. %, 2-hydroxyethyl methacrylate in MeOH under $N_2$

TABLE 2

Mechanical Strength and Flux of Hollow Fiber Membrane

| 0.1 wt % HEMA in MeOH reaction time | Permeability coefficient[a] (l/m$^2$ hr psi) | Critical strength[b] (lb) | | Critical length[b] (inch) | |
|---|---|---|---|---|---|
| | | | (%) | | (%) |
| Original | 12.27 | 1.23 | — | 3.45 | 172.5 |
| 1. 3 min reaction | 29.02 | 1.20 | 97.6 | 3.45 | 172.5 |
| 2. 5 min reaction | 87.02 | 1.19 | 96.7 | 3.56 | 178 |
| 3. 7 min reaction | 80.78 | 1.19 | 96.7 | 3.46 | 173 |
| 4. 10 min reaction | 87.89 | 1.21 | 98.4 | 3.59 | 179.5 |

[a]Slope of flux versus transmembrane pressure curve for filtering of pure water in Amicon Vitafiber shell. The fibers were sealed with silicone ruber.
[b]The starting length of each of the applied hollow fiber membrane was 2 inches. The membrane was streched using the Universal testing instrument (INSTRON) at the rate of 0.2 inches/min. The critical length and critical strength of the membrane are defined as the length and strength of the membrane when it was broken.

The data shows that the modified membranes exhibit higher absolute water and volume fluxes than the unmodified membranes. Nearly all the ratios listed above as a measure of performance are higher for the modified than for the original unmodified membranes. For the case of 10 min. UV exposure and reaction time with 0.1 wt% HEMA (Table 1), the BSA retention was not reduced due to the modification process (>99%, FIG. 3) and the volume permeation flux was higher by 45.6% (i.e. compare 161.22 versus 110.76 1/m2-h).

To show the mechanical integrity of the modified membranes, two inch lengths of modified and unmodified hollow fiber polysulfone membranes were stretched in a Universal Testing Instrument (Instron) at a rate of 0.2 in/min. The data in Tables 1 and 2 refer to the polymer with structure shown in Example 1 below. The results shown in Table 2 indicate negligibly small increases in the critical length (<4.1%) and decreases in the critical strength (<3.5%). Thus, the modification process hardly effects the mechanical integrity of the membranes.

The general formula of poly (arylsulfones) is:

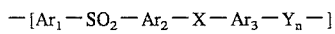

where: $Ar_1$ and $Ar_2$ may be the same or different and may consist of: 1,4-phenylene, 1,3-phenylene, 1,2-phenylene, 4,4'-biphenylene, 1,4-naphthylene, 3-chloro-1, 4-phenylene, 4,4'-diphenylether etc.

X is oxygen, sulfur, nitrogen, methylene
Y is oxygen, sulfur, nitrogen, methylene
$Ar_3$ may be the same or different than $Ar_1$ and $Ar_2$ as well as include such groups as:

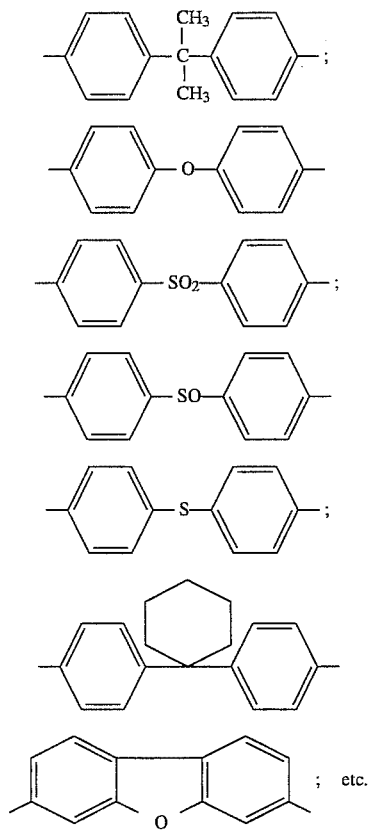

The unsaturated modifying agent should be a vinyl monomer or a combination of vinyl monomers; preferably a monomer soluble in water or methanol or ethanol (alcohols) or a mixture thereof. Some examples are: 2-hydroxyethyl acrylate, 2-hydroxypropyl acrylate, 3-hydroxypropyl acrylate, 2-hydroxyethyl methacrylate, 2,3-dihydroxpropylacrylate, acrylamide, vinyl sulfonic acid, vinyl phosphoric acid, 4-styrenesulfonic acid, methacrylamide, glycidyl acrylate, glycidyl methacrylate, N-methylol-acrylamide, acrylic acid, methacrylic acid, methyl methacrylate, N-vinyl carbazole, N-vinyl pyrrolidone, etc.

Irradiation with nonionizing ultraviolet light can be accomplished using traditional, high, low and medium pressure mercury arc lamps. In addition, such irradiation can be achieved using xenon and carbon arc lamps. Further, other UV sources such as lasers may also be employed in the course of this invention. Other examples of lamps which can be used are "electrodeless" lamps such as microwave driven lamps. Such lamps may be filled with only mercury or may contain mercury which is "doped" with other elements to modify its emission spectrum.

The modified membranes and membrane compositions of the present invention can be used for all and known membrane purposes as listed above, and further the membranes of the present invention can be utilized to separate other materials besides only proteins, such as alcohols, sugars, etc.

Examples of the Process for modification of Aryl Polysulfone Membranes using UV light are as follow:

EXAMPLE 1

A 43 mm diameter circular microporous aryl polysulfone membrane (Amicon Division of the W. R. Grace Co.) having the following structure:

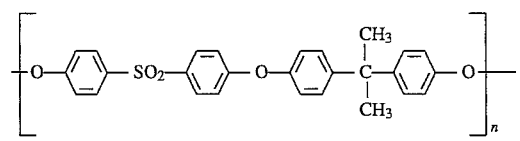

was placed in a 70 mm quartz reaction vessel. The vessel was filled with a 0.5 weight percent aqueous solution of 2-hydroxyethyl methacrylate (HEMA). The solution was then deaerated by bubbling a stream of nitrogen through the solution for a few minutes. Then the reaction mixture was irradiated under nitrogen in a Southern New England Rayonette Irradiator equipped with sixteen low pressure mercury arc lamps with a broad emission at approximately 254 nm. Irradiation was continued for 5 minutes. After irradiation, the membrane was thoroughly washed several times with deionized water. The flux of this membrane was 144.72 L/m$^2$ hr and the rejection of BSA was 99.2%. Prior to modification, the flux was 110.76 L/m$^2$ hr and the rejection was 99.6%.

EXAMPLE 2

Using the same membrane as described above, photomodification was carried out by placing the membrane together with a 0.5 weight % aqueous solution of HEMA in a reaction vessel equipped with a quartz irradiation well. The reaction vessel was equipped with a glass frit at the bottom through which nitrogen was slowly bubbled. Next, the membrane and solution were exposed to a 450 W medium pressure Hanovia Inc. mercury arc lamp. Irradiation was carried out for 3 min. The modified membrane was washed as described in the previous example. After modification, the flux was 70L/m$^2$ hr and the rejection was >99%.

EXAMPLE 3

Experiment No. 1 was repeated replacing HEMA with a 0.2% by weight aqueous solution of glycidyl methacrylate. After irradiating the membrane for 5 minutes, the membrane was washed with deionized water and then immersed in a 1 N aqueous solution of sulfuric acid for two days. Under these conditions, the epoxide rings of the grafted glycidyl methacrylate units were opened to give an aryl polysulfone containing grafted 1,2-dihydroxy- 3-propyl methacrylate monomers. The membrane was thoroughly washed and then subjected to flux and rejection measurements. The modified membrane had a flux of 106.84L/m$^2$ hr and the rejection was 99.5%.

While specific embodiments of the invention have been shown and described in detail to illustrate the application of the principles of the invention, it will be understood that the invention may be embodied otherwise without departing from such principles.

What is claimed is:

1. A process for modifying aryl polysulfone membranes consisting essentially of:

placing an aryl polysulfone membrane into the presence of a hydrophilic vinyl monomer dissolved in a solvent and without any sensitizer or free radical initiator; and exposing the membrane to nonionizing ultraviolet light for a selected period of time for modifying the membrane by chemical grafting and attachment of the monomer at the surface of the membrane by covalent bonding without any sensitizer or free radical initiator.

2. A process according to claim 1, wherein the irradiating light is approximately 254 nm UV light.

3. A process according to claim 1, wherein the selected period of time is more than about ½ minute.

4. A process according to claim 3, wherein the selected period of time is less than about 20 minutes.

5. A process according to claim 1, wherein the monomer is selected from the group consisting of: 2-hydroxyethyl acrylate, 2-hydroxypropyl acrylate, 3-hydroxypropyl acrylate, 2-hydroxyethyl methacrylate, 2,3-dihydroxpropylacrylate, acrylamide, vinyl sulfonic acid, vinyl phosphoric acid, 4-styrenesulfonic acid, methacrylamide, glycidyl acrylate, glycidyl methacrylate, N-methylol-acrylamide, acrylic acid, methacrylic acid, methyl methacrylate, N-vinyl carbazole, and N-vinyl pyrrolidone.

6. A process according to claim 5, wherein the vinyl monomer is 0.1 wt % 2-hydroxyethyl methacrylate in methanol under a nitrogen atmosphere at about ½ and 20 minutes.

7. A process according to claim 6, wherein the wavelength of the ultraviolet light is approximately 254 nm and the selected period of time is between about ½ and 20 minutes.

8. A modified aryl polysulfone membrane having low fouling characteristics, comprising:

an aryl polysulfone membrane having a surface onto which hydrophilic monomers are chemically grafted and attached to the base aryl sulfone to modify the original hydrophobic membrane to a modified hydrophilic water-wetting membrane;

the membrane being made by the process consisting essentially of:

placing an aryl polysulfone membrane into the presence of a hydrophilic vinyl monomer dissolved in a solvent and without any sensitizer or free radical initiator; and exposing the membrane to nonionizing ultraviolet light for a selected period of time for modifying the membrane by chemically grafting and attaching the monomer at the surface of the membrane by covalent bonding without any sensitizer or free radical initiator.

9. A membrane according to claim 8, wherein the membrane is exposed to ultraviolet light for about ½ to 20 minutes.

10. A membrane according to claim 9, wherein the vinyl monomer is selected from the group consisting of: 2-hydroxyethyl acrylate, 2-hydroxypropyl acrylate, 3-hydroxypropyl acrylate, 2-hydroxyethyl methacrylate, 2,3-dihydroxpropylacrylate, acrylamide, vinyl sulfonic acid, vinyl phosphoric acid, 4-styrenesulfonic acid, methacrylamide, glycidyl acrylate, glycidyl methacrylate, N-methylol-acrylamide, acrylic acid, methacrylic acid, methyl methacrylate, N-vinyl carbazole, and N-vinyl pyrrolidone.

11. A membrane according to claim 10, wherein the ultraviolet radiation is at a wave length of approximately 254 nm.

* * * * *